(12) United States Patent
Minto et al.

(10) Patent No.: US 11,192,608 B2
(45) Date of Patent: Dec. 7, 2021

(54) BICYCLE DERAILLEUR

(71) Applicant: Campagnolo S.r.l., Vicenza (IT)

(72) Inventors: Marco Minto, Mirano (IT); Nicola Feo, Verona (IT)

(73) Assignee: Campagnolo S.r.l., Vicenza (IT)

( * ) Notice: Subject to any disclaimer, the term of this patent is extended or adjusted under 35 U.S.C. 154(b) by 435 days.

(21) Appl. No.: 15/902,196

(22) Filed: Feb. 22, 2018

(65) Prior Publication Data

US 2018/0244346 A1    Aug. 30, 2018

(30) Foreign Application Priority Data

Feb. 24, 2017    (IT) ........................ 102017000021394

(51) Int. Cl.
*B62M 9/137* (2010.01)
*B62M 9/1342* (2010.01)

(52) U.S. Cl.
CPC .......... *B62M 9/137* (2013.01); *B62M 9/1342* (2013.01)

(58) Field of Classification Search
CPC .. B62M 9/127; B62M 9/1342; B62M 9/1344; B62M 9/137
See application file for complete search history.

(56) References Cited

U.S. PATENT DOCUMENTS

| | | |
|---|---|---|
| 4,362,522 A | 12/1982 | Huret |
| 4,507,101 A | 3/1985 | Nagano |
| 4,756,704 A * | 7/1988 | Nagano ................ B62M 9/1342 474/144 |
| 5,037,355 A * | 8/1991 | Kobayashi .......... B62M 9/1342 474/82 |
| 5,104,358 A | 4/1992 | Kobayashi |
| 5,346,434 A * | 9/1994 | Hsu ...................... B62M 9/1242 474/82 |
| 5,496,222 A | 3/1996 | Kojima et al. |
| 6,277,044 B1 | 8/2001 | Fujimoto |
| 6,629,903 B1 | 10/2003 | Kondo |
| 7,081,058 B2 | 7/2006 | Nankou |
| 7,438,658 B2 | 10/2008 | Tetsuka et al. |

(Continued)

FOREIGN PATENT DOCUMENTS

| | | |
|---|---|---|
| CN | 1108198 A | 9/1995 |
| CN | 1982154 A | 6/2007 |

(Continued)

OTHER PUBLICATIONS

Campagnolo 6-9 Umwerfer-Schaltzugplatte fur Escape/QS(TM) Ergopo, Dec. 31, 2009 (Dec. 31, 2009), XP055419240, https://www.bike-components.de. Retrieved from the Internet: URL:https:jjwww.bike-components.de/enjCampagnolo/Umwerfer-Schaltzugplatte-fuer-Escap e-QS-Ergopower-Modell-2008-2009-p43338/ [retrieved on Oct. 25, 2017] *figure 1*.

(Continued)

*Primary Examiner* — Minh Truong
(74) *Attorney, Agent, or Firm* — Volpe Koenig

(57) ABSTRACT

A bicycle derailleur comprising a chain guide movable between intermediate positions. An actuation arm associated with the derailleur has a cable seat formed it. A cable-clamping washer includes with a cable-bending appendage that is insertable in the seat of the actuation arm. The actuation arm cooperates with the cable-bending appendage to lock an actuation cable in the desired position.

20 Claims, 5 Drawing Sheets

(56) References Cited

U.S. PATENT DOCUMENTS

| | | |
|---|---|---|
| 9,067,641 B2 | 6/2015 | Kuwayama et al. |
| 10,676,154 B2 * | 6/2020 | Minto ................... B62M 25/02 |
| 2002/0033066 A1 | 3/2002 | Takachi |
| 2002/0033067 A1 | 3/2002 | Takachi |
| 2002/0165054 A1 | 11/2002 | Chen |
| 2003/0100393 A1 | 5/2003 | Nanko |
| 2005/0277503 A1 | 12/2005 | Ichida et al. |
| 2006/0058131 A1 | 3/2006 | Cooke |
| 2007/0135249 A1 | 6/2007 | Nanko |
| 2008/0026891 A1 | 1/2008 | Oseto |
| 2013/0085026 A1 | 4/2013 | Kuwayama et al. |
| 2014/0128189 A1 | 5/2014 | Kuwayama et al. |
| 2016/0121967 A1 | 5/2016 | Nishino |
| 2016/0229488 A1 | 8/2016 | Kuwayama et al. |
| 2018/0244346 A1 | 8/2018 | Minto et al. |
| 2018/0244347 A1 * | 8/2018 | Minto ................... B62M 9/137 |

FOREIGN PATENT DOCUMENTS

| | | | |
|---|---|---|---|
| CN | 103803011 A | | 5/2014 |
| DE | 20 2012 004 089 U1 | | 7/2012 |
| EP | 1069040 A | | 1/2001 |
| EP | 2 578 487 B1 | | 10/2015 |
| EP | 3 000 711 A1 | | 3/2016 |
| JP | 53-086751 U | | 7/1978 |
| JP | 55136676 U1 | | 9/1980 |
| JP | 3043094 U1 | | 9/1989 |
| JP | 3052297 U1 | | 9/1989 |
| JP | 35-046692 U | | 6/1993 |
| JP | 2003-160087 A | | 6/2003 |
| JP | 2006-001317 A | | 1/2006 |

OTHER PUBLICATIONS

Italian Search Report and Written Opinion in Italian Application No. 102017000021394, dated Oct. 26, 2017, with English translation.
Chinese Office Action for Application No. 201810156723.9, dated Aug. 5, 2020. English translation attached.
Chinese Office Action for Application No. 201810156747.4, dated Aug. 10, 2020. English translation attached.
Taiwanese Office Action for Application No. 107105890, dated Apr. 13, 2021. Partial English translation attached.
Japanese Office Action for Application No. 2018-029374, dated Apr. 20, 2021. English translation attached.
Japanese Office Action for Application No. 2018-029375, dated Aug. 31, 2021. English translation attached.

* cited by examiner

BICYCLE DERAILLEUR

CROSS REFERENCE TO RELATED APPLICATION

This application claims the benefit of Italian Application No. 102017000021394 filed on Feb. 24, 2017, which is incorporated herein by reference as if fully set forth.

FIELD OF INVENTION

The present invention relates to a bicycle derailleur, preferably for a racing bicycle.

BACKGROUND

As known, derailleurs, whether front or rear, are used to move the transmission chain from one toothed wheel of the crankset or of the cassette to another toothed wheel of different diameter to carry out gearshifting, by changing the gear ratio.

The movement of the derailleur is obtained through an actuation device mounted on the handlebars so as to be easily maneuvered by the cyclist.

In a mechanical gearshift, the front derailleur is for example moved between the crown gears of the crankset, upwards by a traction action exerted by a normally sheathed inextensible control cable (commonly called Bowden cable), and downwards by the release of the traction of the control cable.

The derailleur comprises a chain guide (or cage) positioned above the transmission chain and a positioning mechanism of the chain guide that is fixed to the frame of the bicycle along the tube ("seat-tube") that connects the bottom bracket to the saddle.

The chain guide is formed from an inner plate and an outer plate facing one another and substantially parallel. The inner plate acts by thrusting on the chain to carry out the passage thereof from a crown having a small diameter to one having a larger diameter (upward gearshifting) and the outer plate acts by thrusting on the chain to carry out the passage thereof from a crown having a larger diameter to one having a smaller diameter (downward gearshifting).

The positioning mechanism of the chain guide is usually formed by a deformable articulated quadrilateral. Such an articulated quadrilateral comprises a fixed body (first side of the quadrilateral) fixedly connected to a strap for the connection about the seat tube, two connecting rods (inner connecting rod and outer connecting rod, which form another two sides of the quadrilateral) rotatably connected to the fixed body about two respective axes and the body of the chain guide itself (which forms the fourth side and completes the articulated quadrilateral) rotatably connected to each of the two connecting rods about two further respective axes. The four axes are parallel to one another.

The outer connecting rod is hinged at the top to the fixed body about the first of the four axes and extends at the top beyond such an axis with an actuation arm to the end of which the control cable of the derailleur is connected.

When the control cable is pulled, the actuation arm is actuated and the outer connecting rod rotates about the first axis. The parallelogram is thus deformed, with the chain guide that is moved outwards to carry out gearshifting.

The control cable usually reaches the actuation arm coming from an area of the bicycle arranged below the front derailleur.

In some solutions, the sheath of the control cable is fixed to the seat tube, or to another tube of the frame of the bicycle, to reach an area close to the bottom bracket and then rise towards the front derailleur.

In other solutions, the sheath of the control cable is inserted inside the seat tube, or another tube of the frame of the bicycle, to then emerge from a aperture in the frame arranged below the front derailleur.

The control cable is connected to the end of the actuation arm laterally, so that the cable itself does not interfere with the positioning mechanism below.

In particular, the control cable is positioned between the side surface of the actuation arm and a cable-clamping washer. The side surface of the actuation arm has a aperture faced by a aperture of the cable-clamping washer and which is engaged by a bolt that abuts against the cable-clamping washer.

In this way, the cable-clamping washer exerts a pressure on the portion of the control cable comprised between the cable-clamping washer and the actuation arm pressing it against the side surface of the actuation arm and constraining it to it.

The cable-clamping washer can be equipped with appendages that make it possible to orient the portion of control cable held between the cable-clamping washer and the actuation arm.

Examples of fastening systems of the control cable to the actuation arm are described in document EP3000711A1 and DE202012004089U1.

In rear derailleurs there is also an articulated quadrilateral linkage that moves a chain guide (having a different shape and geometry from the chain guide of the front derailleur) actuated by a normally sheathed control cable emerging from a aperture in the frame or from suitable transmissions fixedly connected to the frame.

The Applicant has noted that in some situations the control cable (or the sheath in which it is inserted) can interfere with the rear wheel of the bicycle or with other parts of the bicycle, like for example the derailleur itself.

The Applicant has indeed noted that, although the exit aperture of the control cable (or of the sheath in which it is inserted) from the frame is carefully studied, it may be the case that frame manufacturers do not perfectly respect the specifications given to them, providing frames with respect to which the control cable comes out from the exit aperture too close to the rear wheel or to the derailleur.

The Applicant has also noted that the very positioning of the derailleur, which is a function of the type and size of the cranksets used, can be limited by the path that the control cable follows to reach the derailleur, since the control cable must not interfere with other components of the bicycle.

SUMMARY

The Applicant has perceived that by providing a seat on the actuation arm for the cable-bending appendage, so that it is provided with two opposite openings both capable of receiving the cable-bending appendage, it is possible to mount the cable-clamping washer on opposite surfaces of the actuation arm, in both cases ensuring a correct positioning of the cable-bending appendage.

In this way, depending on the path with which the control cable reaches the actuation arm it is possible to select the surface of the actuation arm on which to constrain the control cable that best optimizes the path thereof, preventing the control cable from interfering with parts of the bicycle or with the derailleur itself.

BRIEF DESCRIPTION OF THE DRAWINGS

The features and advantages of the solution will become clearer from the following description of preferred embodiments thereof, made with reference to the attached drawings. In such drawings.

DETAILED DESCRIPTION OF THE PREFERRED EMBODIMENTS

Figure 1:
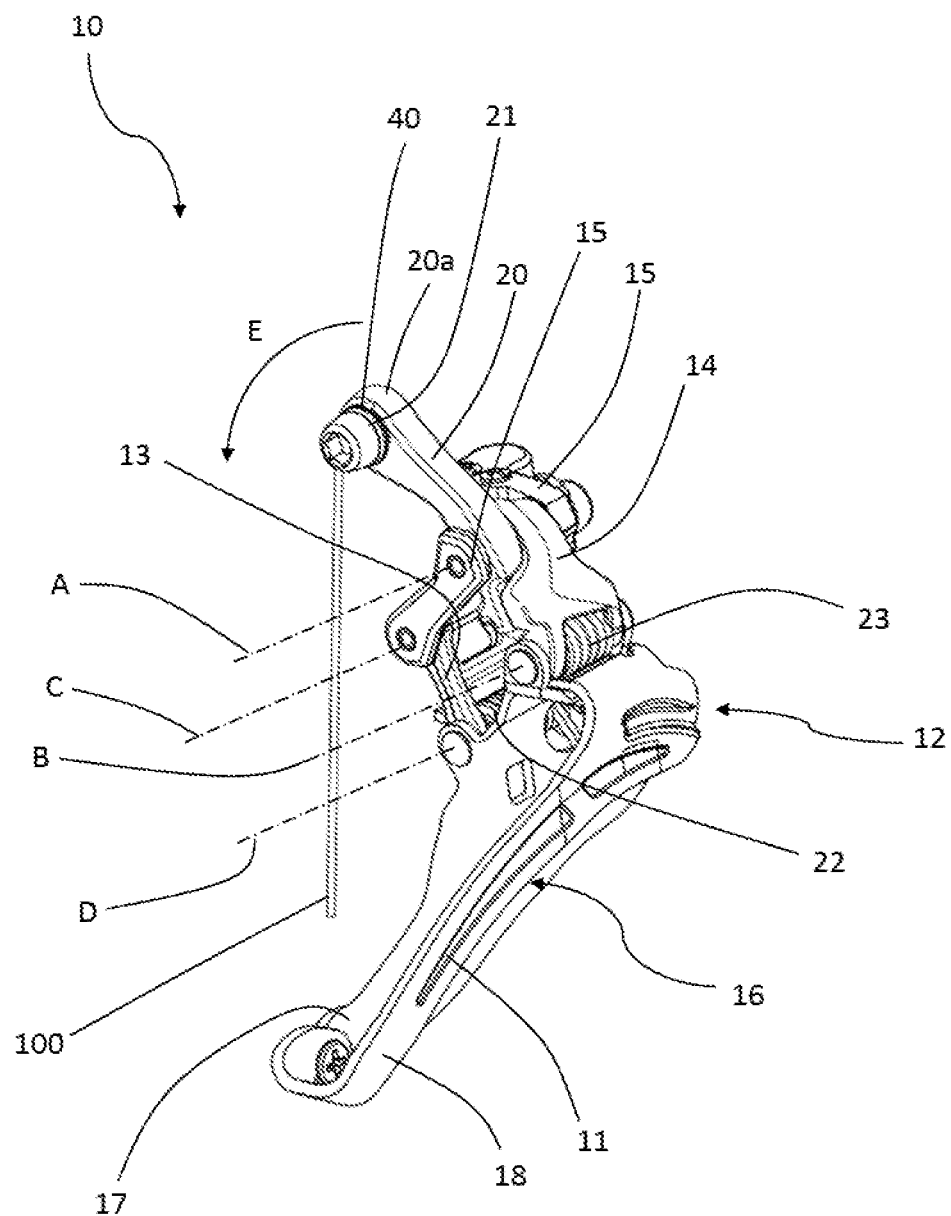
FIG. 1 is a perspective view of a front derailleur with fastening system of the control cable for a bicycle according to the invention.

A bicycle derailleur of the present solution comprises:

a chain guide configured to interact with a transmission chain of the bicycle and movable between a plurality of intermediate positions comprised between an inner position and an outer position;

a fixed body configured for being fixedly associated with a part of frame of the bicycle;

an outer connection element rotatably connected to the fixed body about a first articulation axis and rotatably connected to the chain guide about a second articulation axis parallel to the first articulation axis;

an inner connection element rotatably connected to the fixed body about a third articulation axis and to the chain guide about a fourth articulation axis;

an actuation arm hinged to the fixed body about the first articulation axis;

a cable-clamping washer equipped with a cable-bending appendage insertable in a seat of the actuation arm; said seat extending along a first direction and being provided with a first and a second insertion opening opposite one another and selectively engageable by said cable-bending appendage of the cable-clamping washer.

The bicycle derailleur can comprise one or more of the following preferred features, taken individually or in combination.

Preferably, said first direction is substantially parallel to said first articulation axis.

Preferably, said seat of the actuation arm crosses the entire thickness of the actuation arm along said first direction.

The actuation arm preferably comprises a first surface and a second surface, opposite one another and defining respective end surfaces along the first direction.

The thickness along the first direction of the actuation arm is the distance, measured along such a direction, between two points respectively belonging to the first surface and to the second surface.

The cable-clamping washer can be mounted on the first or second surface of the actuation arm and the cable-bending appendage can be inserted in the seat of the actuation arm in both of the mounting configurations of the cable-clamping washer.

Preferably, said seat del actuation arm is formed on a portion of the actuation arm facing the way of the inner connection element.

In this way, the point of application of the traction force of the control cable, determined by the position of the cable-bending appendage, is always such as to ensure that a traction of the control cable moves the chain guide towards the outer position, irrespective of the mounting configuration of the cable-clamping washer.

Preferably, said cable-clamping washer comprises an inner surface facing said actuation arm; said cable-bending appendage extending in a direction substantially perpendicular to said inner surface.

The inner surface of the cable-clamping washer is preferably substantially flat, just as the portion of surface of the actuation arm that abuts the inner surface of the cable-clamping washer is preferably substantially flat.

Preferably, at least one cable-guiding groove is formed on at least one from said cable-clamping washer and said actuation arm.

The cable-guiding groove has the function of holding the portion of control cable arranged between the cable-clamping washer and the actuation arm in a predetermined position.

Preferably, said cable-guiding groove is formed on said inner surface of the cable-clamping washer.

In this way, possible wearing out or damage to the groove can be solved by simply replacing the cable-clamping washer.

Preferably, said inner surface of the cable-clamping washer comprises a pair of cable-guiding grooves substantially parallel to one another and spaced apart.

In this way, it is possible to ensure that the control cable is held in the same relative position with respect to the actuation arm, in other words the same distance away with respect to the first articulation axis, in both mounting positions of the cable-clamping washer.

Preferably, said cable-clamping washer and said actuation arm comprise a respective aperture engageable along an axial direction by a fixing bolt to fixedly connect the cable-clamping washer to the actuation arm.

Preferably, the cable-guiding grooves of said pair of cable-guiding grooves are arranged on opposite sides with respect to said hole.

Preferably, the cable-guiding grooves are arranged symmetrically with respect to a diameter of said aperture in the cable-clamping washer.

Preferably, said cable-bending appendage is arranged between said pair of cable-guiding grooves.

Preferably, the cable-bending appendage is arranged in a peripheral area of the cable-clamping washer and in a position the projection of which along a direction parallel to the direction of extension of the grooves passes through the center of the aperture in the cable-clamping washer.

Preferably, a ferrule is inserted in said aperture of the actuation arm, said ferrule having an internally threaded cavity that is open at a first and second end; said fixing bolt being selectively insertable in said first and second end and screwable in said through cavity.

In this way it is not necessary to internally thread the aperture in the actuation arm and it is possible to make the ferrule from a different material with respect to the material from which the actuation arm is made.

Preferably, said seat of the actuation arm is distal from said first articulation axis.

In this way, the force transmitted by the control cable necessary to move the chain guide is maximized.

Preferably, said seat of the actuation arm is a groove made on a side surface of the actuation arm.

Such a side surface is preferably arranged between the first surface and the second surface of the actuation arm.

In a first preferred variant, a further seat of the actuation arm extends along a direction parallel to said first direction and is provided with a first and a second insertion opening opposite one another and selectively engageable by said cable-bending appendage of the cable-clamping washer.

By inserting the cable-bending appendage in the further seat of the actuation arm it is possible to change the point of application of the traction force of the control cable along the actuation arm, making it possible to change the movement ratio of the derailleur.

The movement ratio is defined as the ratio between movement of the chain guide and the extent of the movement of the control cable determined by the traction thereof.

In this way, as well as preventing the control cable from interfering with parts of the bicycle or with the derailleur itself, it is possible to select the position on the actuation arm in which to fasten the control cable to obtain a movement ratio within design parameters.

In a second preferred variant, said actuation arm comprises a projection that extends along a direction parallel to said first direction and that comprises opposite ends that extend away from said actuation arm.

The projection performs the same function as the further seat of the actuation arm, making it possible both to prevent the control cable from interfering with parts of the bicycle or with the derailleur itself, and to select the position on the actuation arm in which to fasten the control cable to obtain a movement ratio within design parameters.

Preferably, the derailleur is a front derailleur.

With reference now to the attached figures, a preferred embodiment of the bicycle derailleur in accordance with the present invention is shown. The illustrated derailleur is a front derailleur and is wholly indicated with reference numeral 10.

The front derailleur 10 is preferably a mechanical derailleur, in other words it does not need any electrical and/or electronic device for its operation.

The derailleur 10 comprises a chain guide 11, which is configured to slidably engage a transmission chain of the bicycle (not illustrated) to move it from an inner position to an outer position crossing a plurality of intermediate positions between them.

Predetermined positions of the chain guide 11 correspond to predetermined positions of the transmission chain on the crown gears of the crankset.

In particular, the inner position of the chain guide 11 corresponds to a position of the transmission chain on the smallest crown gear of the crankset and the outer position corresponds to a position of the transmission chain on the largest crown gear of the crankset.

The derailleur 10 comprises an inner end stop and an outer end stop (not illustrated) to limit the excursion of the chain guide 11.

The movement of the chain guide 11 is actuated by a deformable quadrilateral 12. The deformable quadrilateral 12 comprises an inner connection element 13, an outer connection element 14, a fixed body 15 and a movable body 16. The chain guide 11 is fixedly connected to the movable body 16 of the deformable quadrilateral 12.

As illustrated in FIG. 1, the fixed body 15, the movable body 16 and the two connection elements 13, 14 are articulated to one another along four articulation axes A, B, C, D that are parallel to one another. More precisely, the fixed body 15 and the outer connection element 14 are articulated to one another according to a first articulation axis A; the outer connection element 14 and the movable body 16 are articulated to one another according to a second articulation axis B; the fixed body 15 and the inner connection element 13 are articulated to one another according to a third articulation axis C; the inner connection element 13 and the movable body 16 are articulated to one another according to a fourth articulation axis D.

The movable body 16 comprises an inner plate 17 facing an outer plate 18 that make the chain guide 11. The movable body 16 is also provided with perforated flanges along the fourth articulation axis D for the connection to the inner connection element 13 and with perforated flanges for the connection to the outer connection element 14.

The inner and outer connection elements 13, 14 are kinematically connecting rods, in other words they are elements that are not capable of transmitting torque to the elements to which they are connected along the respective articulation axes.

Figure 2:
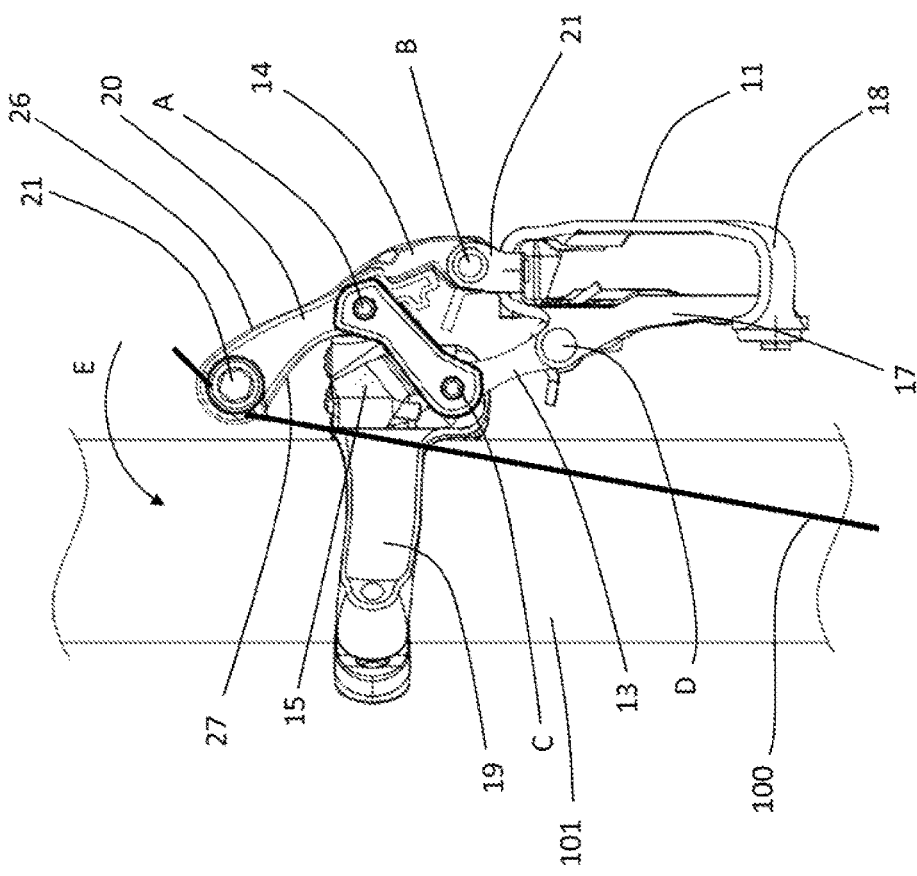
FIG. 2 is a side view of the derailleur of FIG. 1 mounted on a tube of a bicycle.

The fixed body 15 comprises a collar 19 for attaching to a portion of the seat tube of the frame 101 of the bicycle, as schematically illustrated in FIG. 2. The collar 19 allows the derailleur 10 to take up and maintain a predetermined position with respect to the crankset.

In embodiments that are not illustrated, the fixed body 15 can be fixedly connected to the seat tube of the frame of the bicycle without making use of the collar 19, for example welding the fixed body to the seat tube of the frame or constraining the fixed body 15 to an appendage directly formed in the seat tube of the frame.

The derailleur 10 also comprises an actuation arm 20 hinged to the fixed body 15 about the first articulation axis A.

The actuation arm 20 comprises a free end 20*a* at which a fastening system 21 of the control cable 100 is positioned.

When the control cable 100 is placed under traction by the cyclist (through a dedicated control), the actuation arm 20 rotates in a first angular direction E about the first articulation axis A setting the outer connection element 14 in rotation with respect to the fixed body 15.

This rotation of the actuation arm 20 and of the outer connection element 14 determines the deformation of the deformable quadrilateral 12 moving the chain guide 11 towards the outer position.

The deformation of the deformable quadrilateral 12 takes place in contrast to a torsional return spring 22. The torsional return spring 22 is arranged on the fourth articulation axis D and is active between the movable body 16 and the inner connection element 13.

The controlled release of the traction of the control cable 100 determines the deformation of the deformable quadrilateral 12 moving the chain guide 11 towards the inner position. The deformation of the articulated quadrilateral 12 takes place under the thrust of the torsional return spring 22.

The actuation arm 20 can be an extension of the outer connection element 14 and can be made in one piece with it.

In the preferred embodiment of the invention, the actuation arm 20 is physically distinct from the outer connection element 14.

In this solution, illustrated in the attached figures, the actuation arm 20 is fixedly connected to the outer connection element 14 for rotations about the first articulation axis A. In the embodiment of the attached figures, a torsional spring 23 acts with a preload, directed along a second angular direction opposite the first angular direction E, between the actuation arm 20 and the outer connection element 14. The torsional spring 23 opposes rotations along the first angular direction A of the actuation arm 20 with respect to the outer connection element 14.

During the entire excursion of the chain guide 11 from the inner position to the outer position, the actuation arm 20 and the outer connection element 14 behave like a rocker arm that oscillates about the first articulation axis A.

Both in the case in which the actuation arm 20 is in one piece with the outer connection element 14, and in the case in which it is a distinct element from it, the free end 20a of the actuation arm 20 is arranged going away from the first articulation axis A on the opposite side with respect to the second articulation axis B, as represented in FIG. 1.

Figure 3:
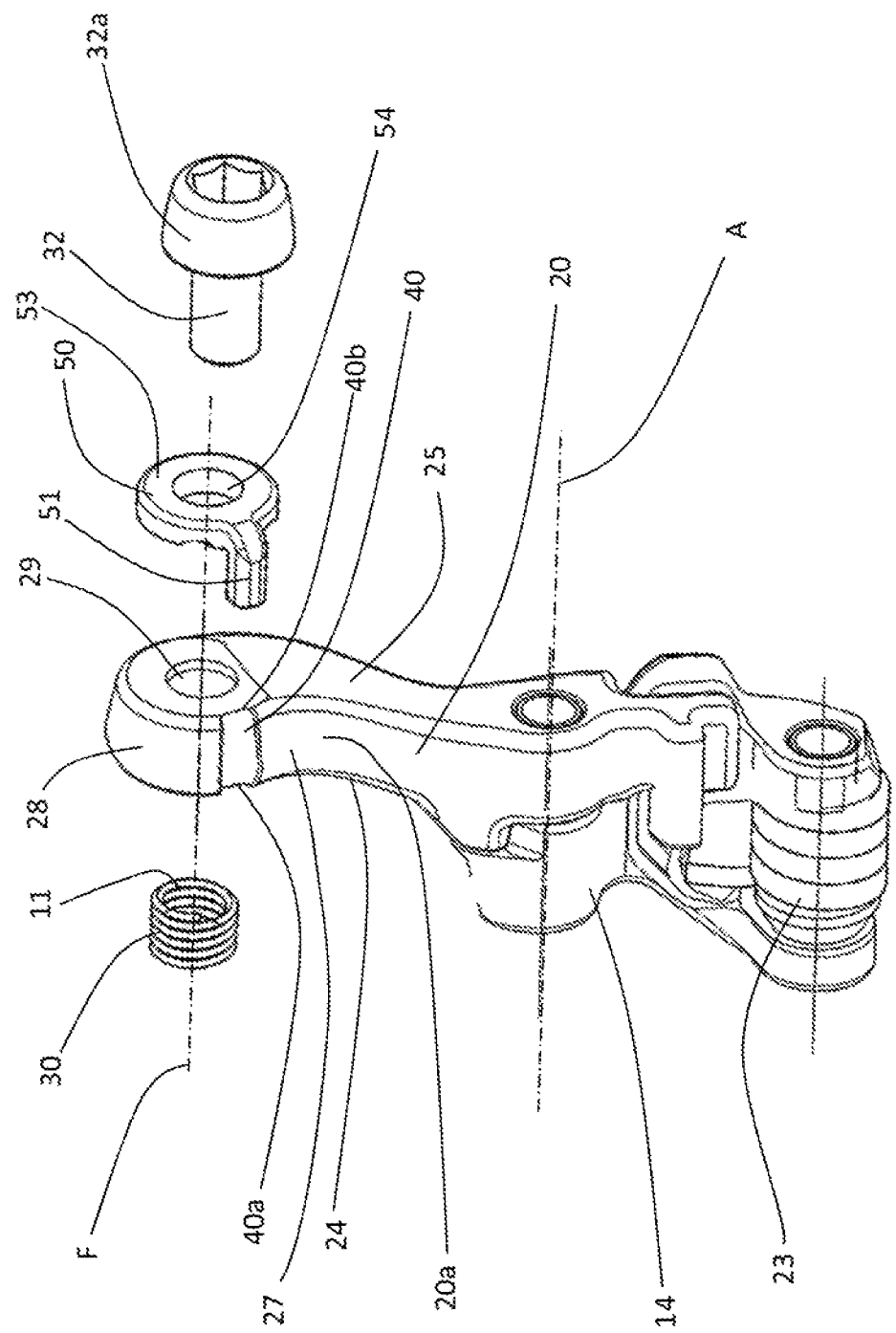
FIG. 3 is a partially exploded perspective view of some details of the derailleur of FIG. 1.

As illustrated in FIG. 3, the actuation arm 20 comprises, close to the free end 20a, a first surface 24 and a second end surface 25 which are opposite one another along a first direction F parallel to the first articulation axis A.

Close to the free end 20a, the actuation arm 20 has a front surface 26 which faces the opposite way with respect to the third C and fourth D articulation axis (FIG. 2), in other words the opposite way with respect to the fixed body 15.

A rear surface 27 of the actuation arm 20 is present close to the free end 20a and faces towards the third C and the fourth D articulation axis D, in other words towards the fixed body 15.

The rear surface 27 is opposite the front surface 26 and both join together the first 24 and the second end surface 25 of the actuation arm 20.

The rear surface 27 and the front surface 26 are joined together by a top surface 28 of the actuation arm 20 (FIG. 3).

The fastening system 21 of the control cable 100 comprises a cable-clamping washer 50 having a cable-bending appendage 51, as illustrated in FIG. 3.

The cable-clamping washer 50 has an inner surface 52 intended to make contact with the actuation arm 20. The cable-bending appendage 51 extends substantially perpendicular to the inner surface 52 and away from it.

Figure 4:
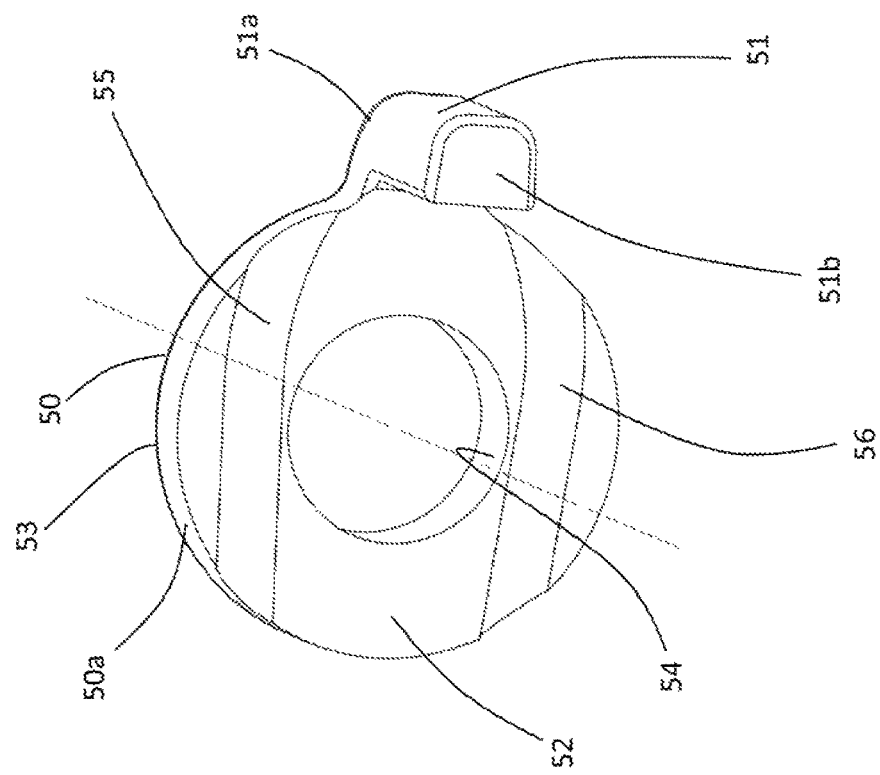
FIG. 4 is an enlarged perspective view of the clamping washer shown on the derailleur of FIG. 3.

As shown in FIG. 4, the cable-bending appendage 51 projects from the outer edge 50a of the cable-clamping washer 51 joining to the edge itself.

The cable-bending appendage 51 has a first end 51a substantially aligned with an outer surface 53 opposite the inner surface 52 of the cable-clamping washer 50. A second end 51b of the cable-bending appendage 51 is arranged going away from the inner surface 52 of the cable-clamping washer 50. The distance that separates the first 51a and the second end 51b of the cable-bending appendage 51 defines the length of the appendage itself.

In the preferred embodiment of the invention, the cable-bending appendage 51 has a prismatic shape in which the first 51a and the second 51b end are substantially parallel to one another.

The cable-bending appendage 51 has a substantially quadrangular base; however it is possible to foresee cable-bending appendages with a substantially cylindrical shape having the ends substantially parallel to one another and with a circular, triangular, elliptical base, etc. . . .

The cable-clamping washer 50 has a circular aperture 54 arranged substantially at the center thereof, the function of which will become clear hereinafter.

On the inner surface 52 of the cable-clamping washer 50 there is at least one, preferably two, cable-guiding grooves 55, 56, see FIG. 4.

The first cable-guiding groove 55 is substantially rectilinear and crosses the entire inner surface 52 opening at both ends on the outer edge 50a of the cable-clamping washer 50. The depth of the first cable-guiding groove 55, in other words its extension towards the outer surface 53, is substantially constant along the entire extension of the groove itself.

The depth of the first cable-guiding groove 55 is less than the diameter of the control cable 100.

The second cable-guiding groove 56 extends perpendicular to the cable-bending appendage 51 and crosses the entire inner surface 52 opening at both ends on the outer edge 50a of the cable-clamping washer 50. The depth of the second cable-guiding groove 56, in other words its extension towards the outer surface 53, is substantially constant along the entire extension of the groove itself.

The depth of the second cable-guiding groove 56 is less than the diameter of the control cable 100.

The depths of the first 55 and of the second cable-guiding groove 56 are substantially identical.

The first cable-guiding groove 55 and the second cable-guiding groove 56 are parallel to one another and have substantially identical length.

As illustrated in FIG. 4, the first cable-guiding groove 55 and the second cable-guiding groove 56 are arranged on opposite sides of the aperture 54 of the cable-clamping washer 50.

The free end 20a of the actuation arm 20 is provided with a through aperture 29 which crosses the actuation arm along the first direction F. The through aperture 29 extends between the first 24 and the second surface 25 of the actuation arm 20, as illustrated in FIG. 3.

A ferrule 30 is inserted inside the through aperture 29, said ferrule comprising a cylindrical inner cavity 31 open at both ends.

The inner cavity 31 of the ferrule 30 is threaded to receive a bolt 32.

The ferrule 30 is preferably made of steel and the actuation arm 20 is preferably made of aluminum or an aluminum alloy.

The actuation arm 20 comprises, at the free end 20a, a seat 40 that extends along the first direction F.

The seat 40 comprises a first 40a and a second insertion opening 40b opposite one another and arranged at the ends of the seat 40.

The first 40a and the second insertion opening 40b are respectively formed on the first 24 and second surface 25 of the actuation arm 20, as illustrated in FIG. 3.

The seat 40 crosses the entire thickness of the actuation arm 20 measured along the first direction F between the first 24 and the second surface 25.

As illustrated in FIG. 3, the seat 40 is formed on the inner surface 27 of the actuation arm 20 and is open on such an inner surface 27 defining a groove.

In other words, the seat 40 is a groove formed on the inner surface 27 of the actuation arm 20 that extends between the first 24 and the second surface 25 of the actuation arm 20.

The insertion openings 40a and 40b are sized so as to be able to receive the cable-bending appendage 51 of the cable-clamping washer 50.

The size of the seat 40 between the two insertion openings 40a and 40b is such as to be able to receive the cable-bending appendage 51 of the cable-clamping washer 50.

When the cable-bending appendage 51 is inserted in the seat 40, the control cable 100 contacts the cable-bending appendage 51 at a first contact surface which defines a point of application of the traction force of the control cable 100 on the actuation arm 20.

Figure 7:
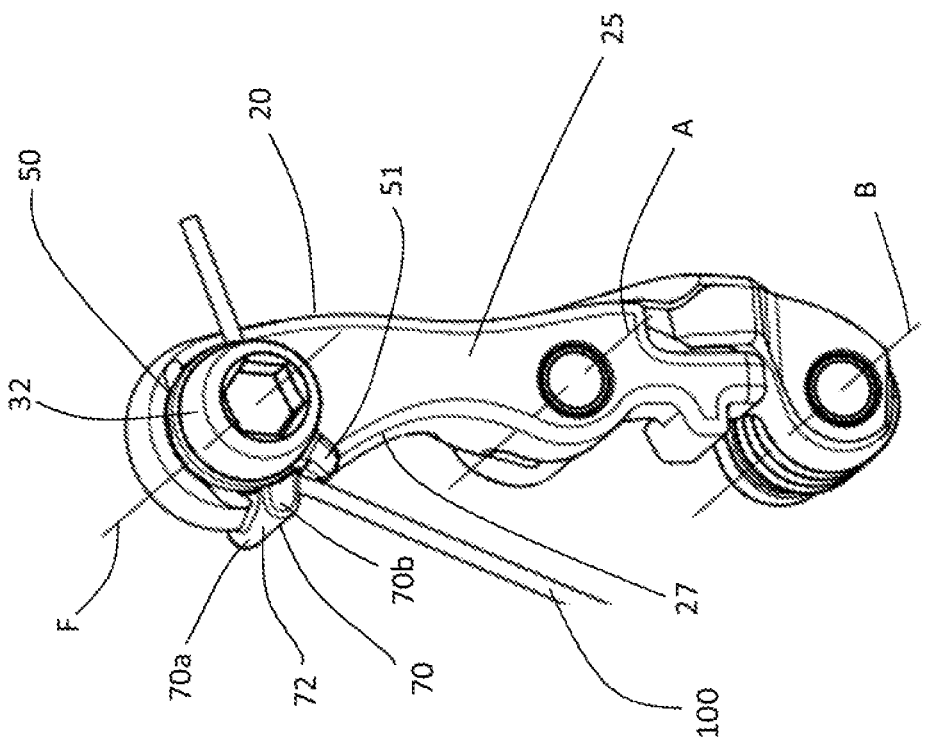
FIG. 7 is a perspective view of some parts of the derailleur of FIG. 1 in a first variant embodiment.

According to a first variant embodiment, illustrated in FIG. 7, the actuation arm 20 comprises a further seat 60 equipped with a first 60a and a second insertion opening 60b opposite one another and arranged at the ends of the further seat 60.

The first 60a and the second insertion opening 60b are respectively formed on the first 24 and second surface 25 of the actuation arm 20.

The further seat 60 crosses the entire thickness of the actuation arm 20 along the first direction F between the first 24 and the second surface 25.

The further seat 60 is open on the inner surface 27 of the actuation arm 20 defining a groove.

In other words, the further seat 60 is a groove formed on the inner surface 27 of the actuation arm 20 that extends between the first 24 and the second surface 25 of the actuation arm 20.

The further seat 60 is arranged in a position further from the first articulation axis A with respect to the seat 40.

The cable-bending appendage 51 of the cable-clamping washer 50 is engageable in the further seat 60 as an alternative to engagement in the seat 40.

When the cable-bending appendage 51 is inserted in the further seat 40, the control cable 100 contacts the cable-bending appendage 51 at a second contact surface, different from the first contact surface, which defines a point of application of the traction force of the control cable 100 on the actuation arm 20.

The first contact surface is arranged a shorter distance with respect to the second contact surface from a plane that contains both the first A and the second articulation axis B.

The engagement of the control cable 100 in the seat 40 or in the further seat 60 determines different movement ratios of the derailleur.

In particular, the engagement of the control cable 100 in the seat 40 determines a greater movement ratio with respect to the movement ratio given by the engagement of the control cable 100 in the further seat 60.

Figure 8:
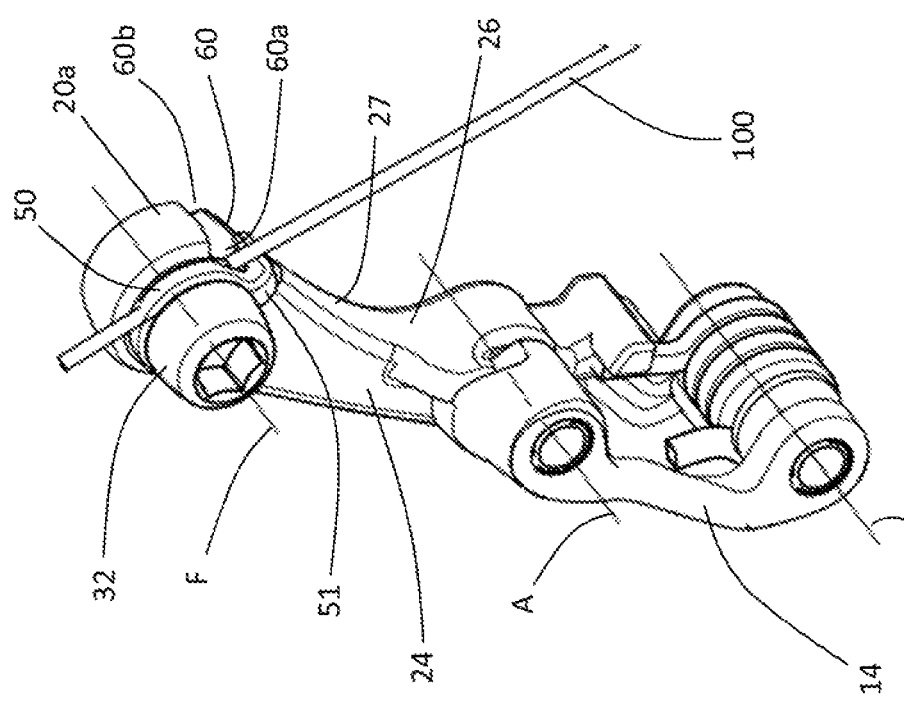
FIG. 8 is a perspective view of some parts of the derailleur of FIG. 1 in a second variant embodiment.

In a second variant embodiment, illustrated in FIG. 8, the actuation arm 20 comprises a projection 70 emerging from the actuation arm 20 and in one piece with it.

The projection 70 extends along the first direction F and is arranged a greater distance from the first articulation axis A with respect to the seat 40.

The projection 70 comprises a first 70a and a second portion 70b opposite one another and extending beyond the first 24 and the second surface 25 of the actuation arm 20 along the first direction F.

The projection 70 has an elongated shape along the first direction F.

The projection 70 acts as a cable-bending element for the control cable 100 when the latter abuts on the projection 70 as an alternative to the abutment on the cable-bending appendage 51 inserted in the seat 40.

The projection 70 has a second contact surface which deviates the path of the control cable 100 before it reaches the cable-clamping washer 50 to be held on the actuation arm 20.

The second contact surface is arranged on a front surface 72 of the projection 70 facing the opposite way with respect to the cable-clamping washer 50.

The first contact surface on the cable-bending appendage 51 is arranged a shorter distance with respect to the second contact surface 71 from a plane containing both the first A and the second articulation axis B.

The movement ratio determined by the first contact surface is greater than the movement ratio determined by the second contact surface.

In particular, the engagement of the control cable 100 in the seat 40 determines a greater movement ratio with respect to the movement ratio given by the engagement of the control cable 100 on the projection 70.

In use, the control cable 100 is held between the cable-clamping washer 50 and the actuation arm 20.

In particular, the cable-bending appendage 51 of the cable-clamping washer 50 is inserted in an insertion opening 40a, 40b with the control cable 100 that, resting on the cable-bending appendage 51 is inserted in a cable-guiding groove 55, 56 of the cable-clamping washer 50.

The aperture 54 of the cable-clamping washer 50 is engaged by the bolt 32 which is screwed into the ferrule 30 inserted in the through aperture 29 in the actuation arm 20.

By tightening the bolt 32, the head 32a thereof presses the cable-clamping washer 50 against the actuation arm 20 stably constraining the control cable 100.

Figure 5:
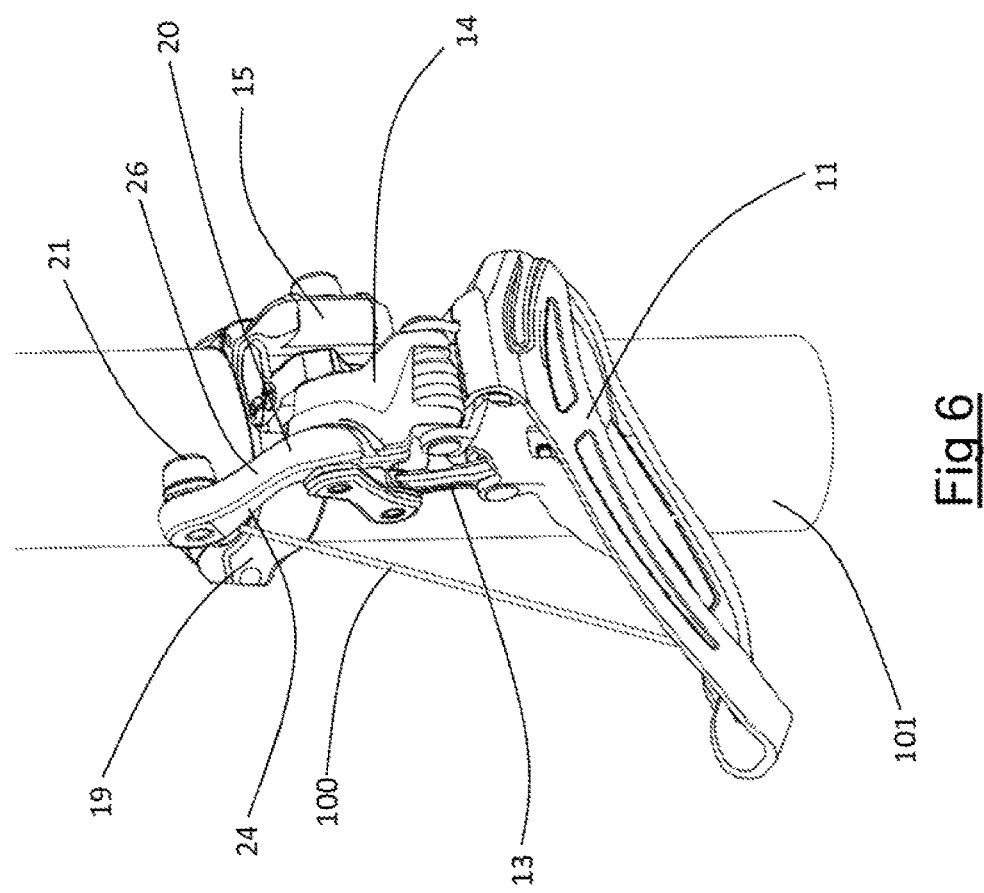
FIGS. 5 and 6 are perspective views of the derailleur of FIG. 1 in two configurations of use.
Figure 6:
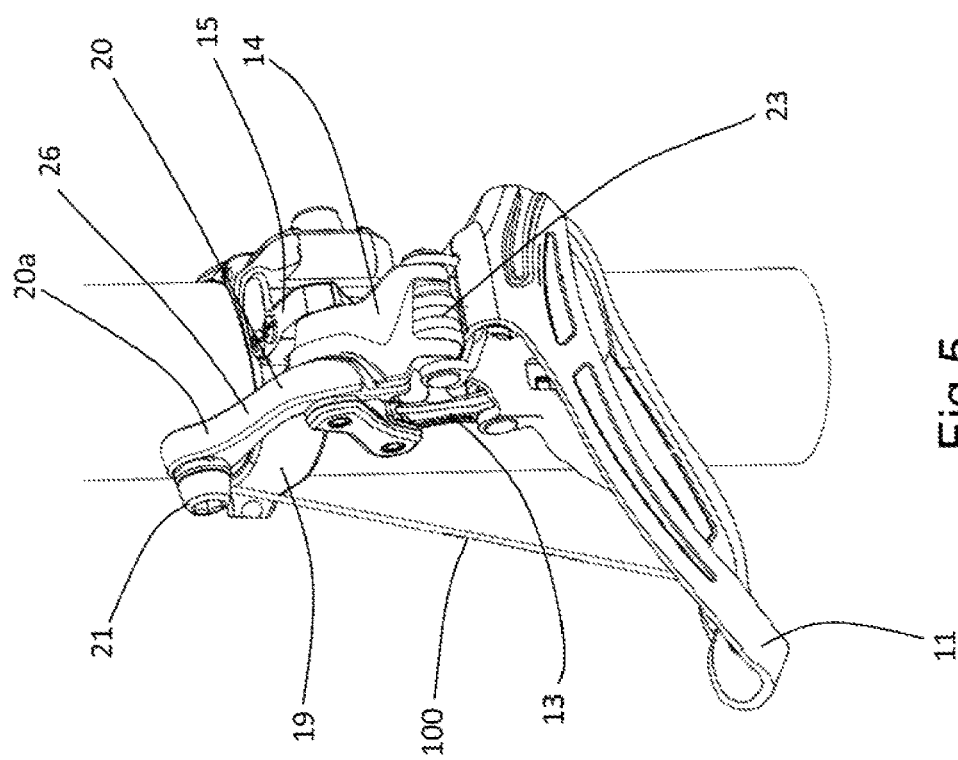

In particular, depending on the specific needs, in other words depending on the path followed by the control cable 100 to reach the actuation arm 20, the cable-clamping washer 50 can be constrained to the first 24 (as indicated in FIG. 5) or to the second surface 25 of the actuation arm 20 (as indicated in FIG. 6).

In the case in which the cable-clamping washer 50 is positioned on the first surface 24 of the actuation arm 20, the cable-bending appendage 51 is inserted in the first insertion opening 40a of the seat 40.

In the case in which the cable-clamping washer 50 is positioned on the second surface 25 of the actuation arm 20, the cable-bending appendage 51 is inserted in the second insertion opening 40b of the seat 40.

The positioning of the cable-clamping washer 50 on the second surface 25 of the actuation arm 20 mirrors the positioning of the cable-clamping washer 50 on the first surface 24 of the actuation arm 20 with respect to a hypothetical plane perpendicular to the first direction F.

In the case in which the movement ratio must be decreased, the first or the second variant embodiment is used.

When the first variant embodiment is used, the cable-bending appendage 51 of the cable-clamping washer 50 is inserted in the insertion opening 60a, 60b of the further seat 60 with the control cable 100 that, resting on the cable-bending appendage 51, is inserted in a cable-guiding groove 55 of the cable-clamping washer 50.

Also in this case, depending on the path followed by the control cable 100 to reach the actuation arm 20, the cable-clamping washer 50 can be constrained to the first 24 (as illustrated in FIG. 7) or to the second surface 25 of the actuation arm 20.

When the second variant embodiment is used, the control cable 100 is arranged resting on one of the two portions of the projection 70 that extend beyond the first 24 and the second surface 25 of the actuation arm.

The choice between the two portions of the projection 60 to be used depends on the specific mounting needs of the derailleur and preventing the control cable 100 from interfering with parts of the derailleur or of the bicycle.

When the portion 70a of projection 70 that extends beyond the first surface 24 of the actuation arm 20 is used, the cable-clamping washer 50 is positioned on the first surface 24 of the actuation arm 20 and the anti-cable-bending appendage 51 is inserted in the first insertion opening 40a of the seat 40.

When the portion 70b of projection 70 that extends beyond the second surface 25 of the actuation arm 20 (as illustrated in FIG. 8) is used, the cable-clamping washer 50 is positioned on the second surface 25 of the actuation arm 20 and the cable-bending appendage 51 is inserted in the second insertion opening 40b of the seat 40.

Of course, those skilled in the art can bring numerous modifications and variants to the invention described above, in order to satisfy specific and contingent requirements, like for example foreseeing cable-guiding grooves on the actuation arm as an alternative to or in combination with the cable-guiding grooves of the cable-clamping washer, all in any case covered by the scope of protection of the present invention as defined by the following claims.

What is claimed is:

1. A bicycle derailleur comprising:
a chain guide configured to interact with a transmission chain of a bicycle and moves among a plurality of intermediate positions between an inner position and an outer position;
a fixed body configured for being fixedly associated with a part of a frame of the bicycle;
an outer connection element rotatably connected to the fixed body about a first articulation axis (A) and rotatably connected to the chain guide about a second articulation axis (B) that is parallel to the first articulation axis (A);
an inner connection element rotatably connected to the fixed body about a third articulation axis (C) and to the chain guide about a fourth articulation axis (D);
an actuation arm hinged to the fixed body about the first articulation axis (A); and,
a cable-clamping washer that includes a cable-bending appendage that mates with a seat formed in the actuation arm;
said seat extending along a first direction (F) and being provided with a first insertion opening and a second insertion opening that are opposite one another and selectively engageable by said cable-bending appendage of the cable-clamping washer;
wherein said cable-clamping washer has a pair of cable-guiding grooves that are on an inner surface and substantially parallel to one another and spaced apart, and
wherein said cable-bending appendage extends in a direction substantially perpendicular to said inner surface of said cable-clamping washer.

2. The derailleur according to claim 1, wherein said first direction (F) is substantially parallel to said first articulation axis (A).

3. The derailleur according to claim 1, wherein said seat in the actuation arm crosses an entire thickness of the actuation arm along said first direction (F).

4. The derailleur according to claim 1, wherein said seat in the actuation arm is formed on a portion of the actuation arm such that said seat in the actuation arm and the inner connection element are facing in a common direction.

5. The derailleur according to claim 1, wherein respective cable-guiding grooves of said pair of cable-guiding grooves are arranged on opposite sides with respect to an aperture of the cable-clamping washer.

6. The derailleur according to claim 1, wherein said cable-bending appendage is arranged between said pair of cable-guiding grooves.

7. The derailleur according to claim 1, wherein said seat in the actuation arm is distal from said first articulation axis (A).

8. The derailleur according to claim 1, wherein said seat in the actuation arm is a groove on a front surface of the actuation arm.

9. A bicycle derailleur comprising:
a chain guide configured to interact with a transmission chain of a bicycle and moves among a plurality of intermediate positions between an inner position and an outer position;
a fixed body configured for being fixedly associated with a part of a frame of the bicycle;
an outer connection element rotatably connected to the fixed body about a first articulation axis (A) and rotatably connected to the chain guide about a second articulation axis (B) that is parallel to the first articulation axis (A);
an inner connection element rotatably connected to the fixed body about a third articulation axis (C) and to the chain guide about a fourth articulation axis (D);
an actuation arm hinged to the fixed body about the first articulation axis (A); and,
a cable-clamping washer that includes a cable-bending appendage that mates with a seat formed in the actuation arm and extends in a direction substantially perpendicular to an inner surface of said cable-clamping washer that is facing said actuation arm;
said seat extending along a first direction (F) and being provided with a first insertion opening and a second insertion opening that are opposite one another and selectively engageable by said cable-bending appendage of the cable-clamping washer;
wherein said inner surface of the cable-clamping washer comprises a pair of spaced apart cable-guiding grooves that are substantially parallel to one another and have a common depth and width.

10. The derailleur according to claim 9, wherein said first direction (F) is substantially parallel to said first articulation axis (A).

11. The derailleur according to claim 9, wherein said seat in the actuation arm crosses an entire thickness of the actuation arm along said first direction (F).

12. The derailleur according to claim 9, wherein said seat in the actuation arm is formed on a portion of the actuation arm such that said seat in the actuation arm and the inner connection element are facing in a common direction.

13. The derailleur according to claim 9, wherein respective cable-guiding grooves of said pair of spaced apart cable-guiding grooves are arranged on opposite sides with respect to an aperture of the cable-clamping washer.

14. The derailleur according to claim 9, wherein said cable-bending appendage is arranged between said pair of cable-guiding grooves.

15. The derailleur according to claim 9, wherein said seat in the actuation arm is distal from said first articulation axis (A).

16. The derailleur according to claim 9, wherein said seat in the actuation arm is a groove on a front surface of the actuation arm.

17. The derailleur according to claim 16, wherein said seat in the actuation arm is formed on a portion of the actuation arm such that said seat in the actuation arm and the inner connection element are facing in a common direction.

18. The derailleur according to claim 16, wherein said cable-bending appendage extends in a direction substantially perpendicular to an inner surface of said cable-clamping washer facing said actuation arm.

19. The derailleur according to claim 16, wherein said seat in the actuation arm crosses an entire thickness of the actuation arm along said first direction (F).

20. The derailleur according to claim 9, wherein said cable-bending appendage extends in a direction substantially perpendicular to an inner surface of said cable-clamping washer facing said actuation arm.

\* \* \* \* \*